United States Patent [19]

Gange

[11] 4,443,664

[45] Apr. 17, 1984

[54] TELEPHONE STATION INCORPORATING EXCHANGE MESSAGE SYSTEM

[75] Inventor: Robert A. Gange, Belle Mead, N.J.

[73] Assignee: RCA Corporation, New York, N.Y.

[21] Appl. No.: 394,821

[22] Filed: Jul. 2, 1982

[51] Int. Cl.³ .......................................... H04M 15/06
[52] U.S. Cl. ................................ 179/5.5; 179/90 BD; 179/84 C; 179/84 VF; 179/2 DP
[58] Field of Search ................ 179/2 A, 2 DP, 81 C, 179/84 C, 84 L, 84 VF, 5.5, 89, 90 BB, 90 BD

[56] References Cited

U.S. PATENT DOCUMENTS

| | | | |
|---|---|---|---|
| 3,301,958 | 1/1967 | Blakeslee et al. | 179/90 BB |
| 3,932,709 | 1/1976 | Hoff et al. | 179/2 DP X |
| 4,121,052 | 10/1978 | Richard | 179/84 VF X |
| 4,241,238 | 12/1980 | Strand | 179/5.5 |
| 4,304,968 | 12/1981 | Klausner | 179/5.5 X |

FOREIGN PATENT DOCUMENTS

| | | | |
|---|---|---|---|
| 2806234 | 8/1979 | Fed. Rep. of Germany | 179/5.5 |
| 2271723 | 12/1975 | France | 179/84 L |
| 56-119567 | 9/1981 | Japan | 179/84 L |

OTHER PUBLICATIONS

Smith, D. B., "The Audio Response Unit User's Guide"; Technical Report 27, Univ. of Mich., Apr. 1970, pp. 1-21.

Primary Examiner—A. D. Pellinen
Assistant Examiner—Keith E. George
Attorney, Agent, or Firm—J. S. Tripoli; G. J. Seligsohn

[57] ABSTRACT

Microelectronic, locally-situated circuitry and memories, together with digital displays, are employed for modifying otherwise standard telephone stations so that the telephone stations can be utilized to store digital messages, such as the Caller's telephone number, transmitted by each of a plurality of Callers to an unattended User station. The unattended User station automatically retransmits a received digital message back to the Caller for verification, permitting the Caller to correct any error in the digital message or to send to the User station a verification signal that is also stored. All the stored information is available to the User upon his return, and may be used to automatically dial back the Callers.

11 Claims, 7 Drawing Figures

TELEPHONE STATION INCORPORATING EXCHANGE MESSAGE SYSTEM

This invention relates to a telephone exchange message system (TEMS) among telephone subscribers and, more particularly, to such a system which only requires modification of a subscriber's telephone station, rather than any modification of the telephone network.

With the advent of microelectronics, it has become possible to inexpensively modify a standard rotary dial or push-button telephone station (subset) to provide a subscriber with telephone service of greater utility and versatility than was heretofore available to him. Such microelectronics makes practical the Telephone Exchange Message System (TEMS) with which the present invention is concerned.

In accordance with the principles of the present invention, a TEMS station includes, in addition to the devices normally present in a dial (i.e., either a rotary dial or a push-button) telephone station, a user controlled exchange memory (UCEM), an auxiliary register, preferably an affirmative/non-affirmative register, an output display, a pointer display and associated logic. The logic is operated by manually-activated switch means, which, at the very least, is comprised of the cradle switch and rotary dial or push-button key pad of the telephone station. The manually-activated switch means may also include additional switches and/or push buttons.

An important feature of TEMS is its ability to verify and store digital messages communicated between two TEMS modified stations, when one of the two stations is unattended. By way of example, if any given TEMS modified station (hereinafter referred to as the "User" station), while unattended, receives a call from another station (which other station may be either a TEMS modified station or a standard telephone station), the User station will automatically return a certain distinctive tone signal to the Caller station, which is known to subscribers and indicates to the Caller that the User station is unattended. The Caller may then use his dial or push-button to transmit a digital message, such as the Caller's telephone number, to the User station. The User station stores the received digital message and then automatically retransmits the digital message back to the Caller station. The Caller station, if it is also a TEMS modified station, temporarily stores and displays the retransmitted digital message as a digital number on an output display. Depending upon whether the digital number displayed is the same as or is different from that originally transmitted by the Caller, the Caller may employ his dial or push-buttons to send either an "affirmative transmission" or a "non-affirmative-transmission" code, known to TEMS subscribers, back to the User station, verifying or denying the accuracy of the digital message. In response to the receipt of a non-affirmative transmission code by the User station, the temporarily stored digital message is, in effect, dumped and the User station invites a transmission of a corrected digital message from the Caller. In response to the receipt of an affirmative transmission code by the User station, the temporarily stored digital message is transferred to an allotted one of a plurality of UCEM registers, and the fact that the digital message in that assigned UCEM register has been verified is additionally registered. If neither an affirmative transmission code or a non-affirmative transmission code is received by the User station, either because the Caller station is not a TEMS modified station or otherwise, the temporarily stored digital message is transferred to the assigned UCEM register in response to the disconnect of the Caller station, and the fact that the digital message in that assigned UCEM register has not been verified is additionally registered. The User, after returning, can selectively display each digital message stored in the respective UCEM registers. The verified or non-verified status of each message is automatically communicated to the User at this time. Further, the TEMS modified station also may be utilized to automatically dial frequently-dialed numbers stored in a separate section of UCEM registers.

Figure 3:
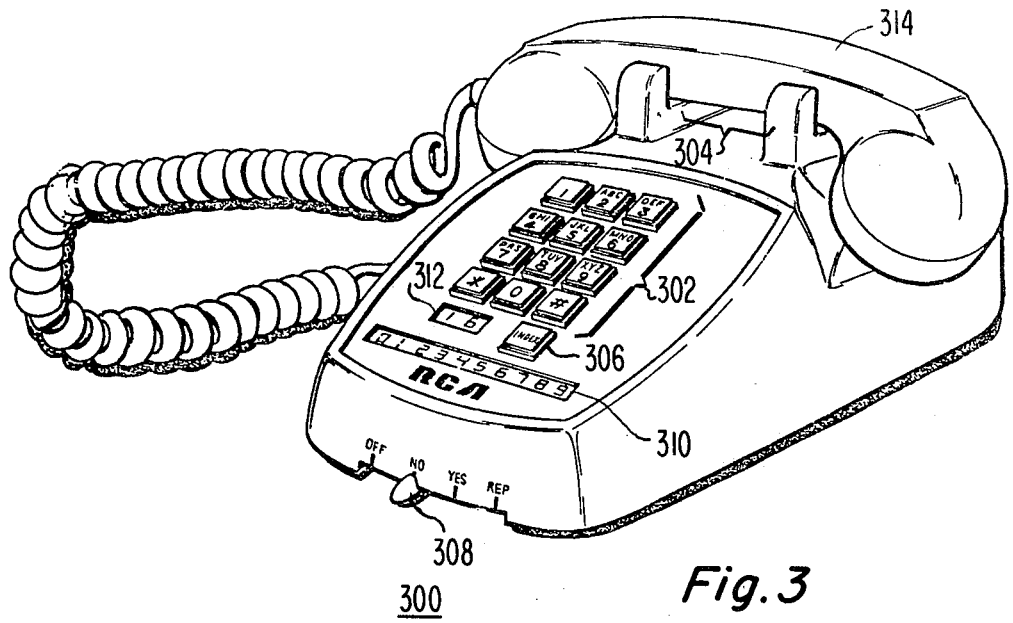
FIG. 3 illustrates the outward appearance of one embodiment of a TEMS modified station.
Figure 5A:
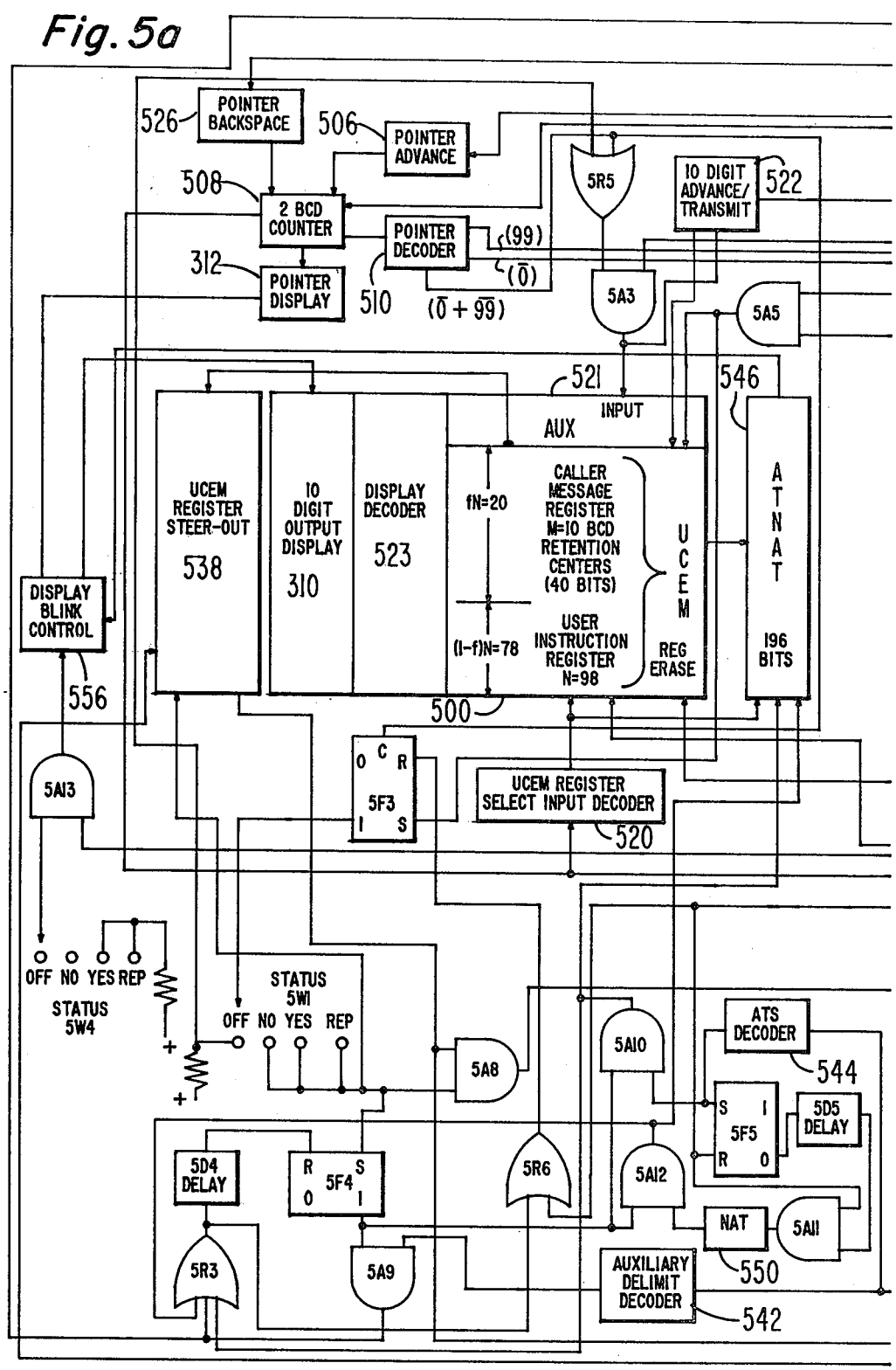
Figure 5B:
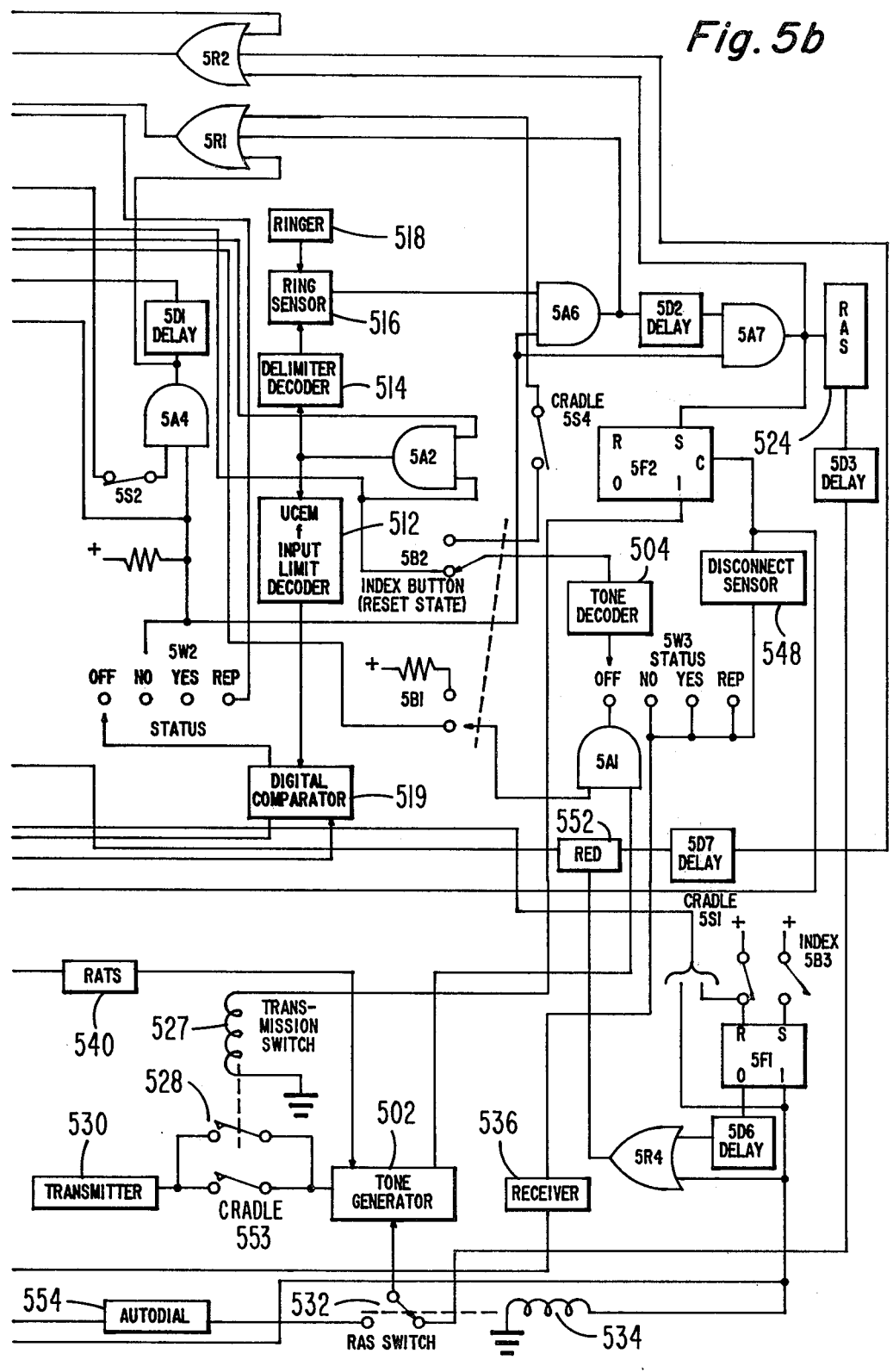
Figure 6:
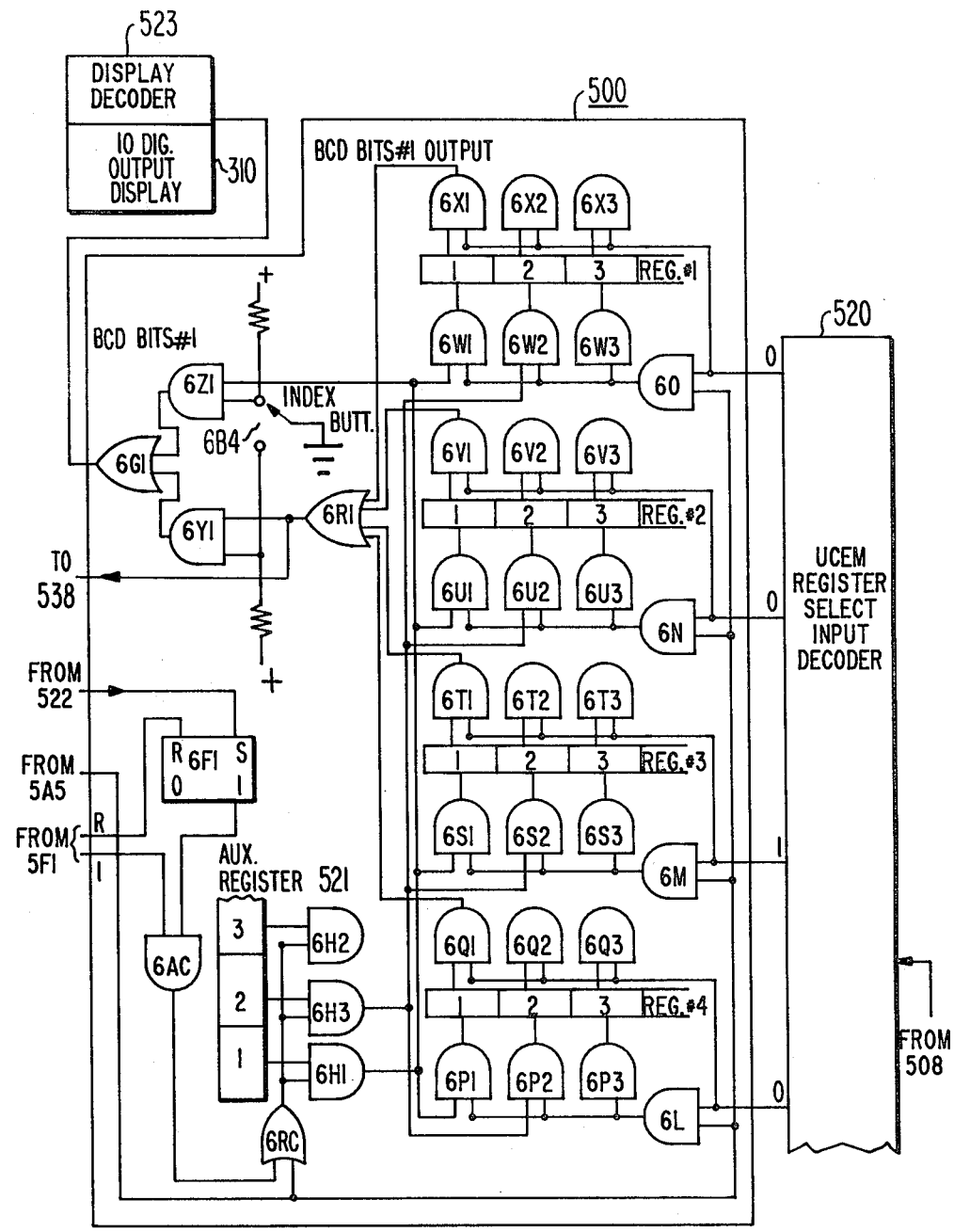

FIGS. 5a and 5b, taken together and referred to below as FIG. 5, are a block diagram of circuitry of an illustrative embodiment of the TEMS station modification whose outward appearance is shown in FIG. 3; and FIG. 6 illustrates, in more detailed form, some of the circuitry shown in block form in FIG. 5.

In the drawings, the first digit of the reference numerals employed in each of the figures is the same as that of the figure number in which they appear.

Figure 1:
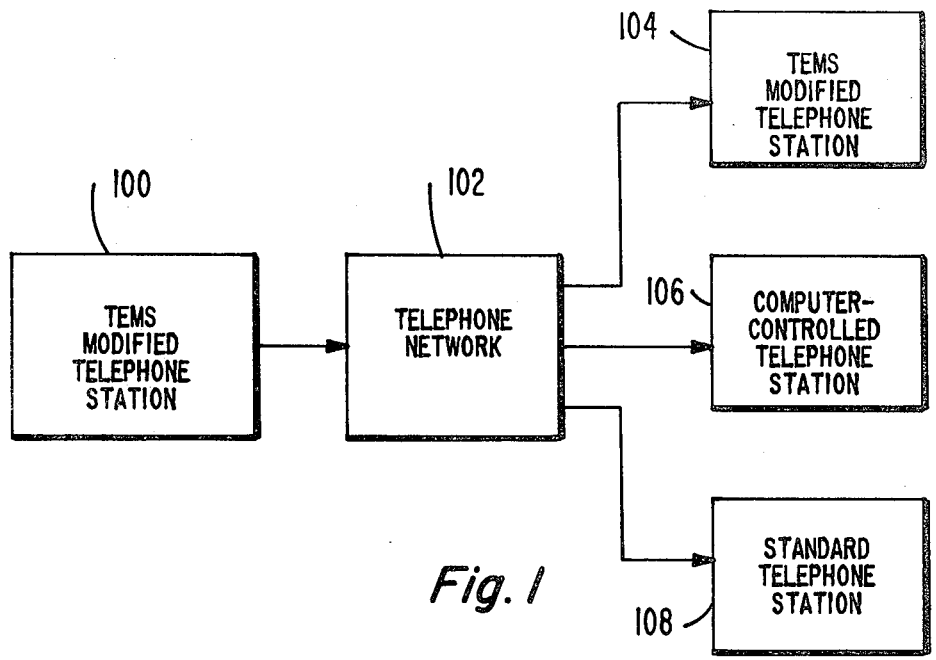
FIG. 1 is a block diagram of a telephone system incorporating a telephone exchange message system (TEMS)

FIG. 1 is a diagram of a Telephone Exchange Message System (TEMS). Any particular TEMS Modified telephone station 100 is connectable by a telephone line through telephone network 102 to either another TEMS modified telephone station 104, a computer-controlled telephone station 106 or a standard telephone station 108. The telephone network 102, may be merely a private or a private-branch-exchange (PBX) or, alternatively, it may include intrastate, interstate or even international trunk lines. In any case, no modification of telephone network 102 is required to provide the Telephone Exchange Message System (TEMS), with which the present invention is concerned. TEMS modified telephone stations 100 and 104 are identical in all respects, and in illustrative embodiment thereof is described in detail below. Computer-controlled telephone station 106 may be an unattended telephone station controlled by a computer, which computer may be programmed to cooperate with a TEMS modified telephone station. For instance, computer controlled telephone station 106 may be located at a bank and be part of a bank-by-telephone system. Standard telephone station 108 is any currently-available rotary dial or push-button telephone that has not been modified in any way. As indicated in FIG. 1, the Telephone Exchange Message System (TEMS) provides complete compatibility among TEMS modified telephone stations, computer-controlled telephone stations and standard telephone stations.

Figure 2:
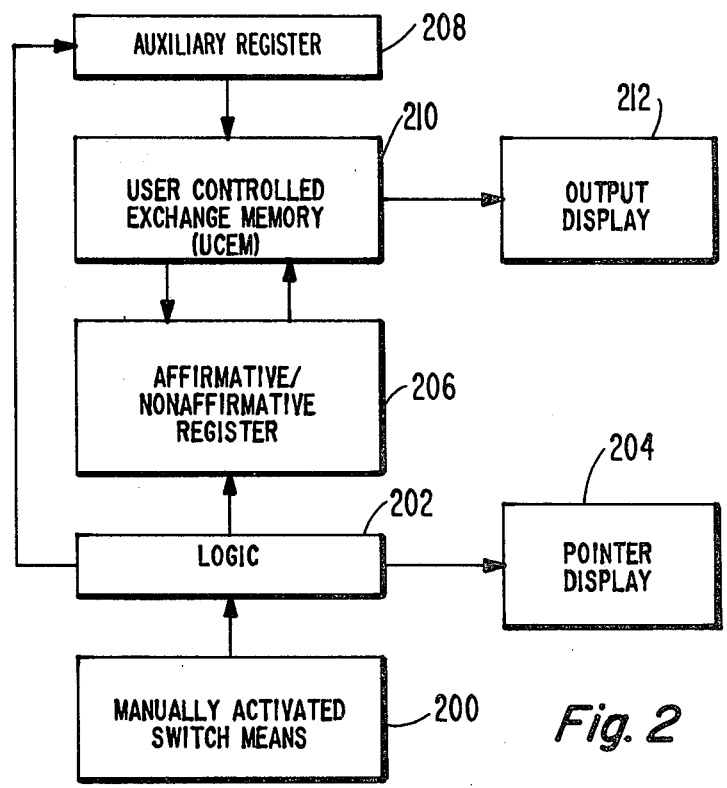
FIG. 2 is a functional block diagram of a TEMS station modification.

Referring to FIG. 2, a TEMS station makes use of Manually Activated Switch Means 200, which includes, at the very least, a rotary dial or push-button key pad and the cradle switch of a standard telephone station. Manually activated Switch Means 200 may also include one or more additional push-buttons and/or manually operated switches. Signals from Manually Activated Switch Means 200 are coupled as inputs to Logic Circuitry 202, which, in turn, controls Pointer Display 204, Affirmative/Non-Affirmative Register 206, and Auxiliary Register 208, which have inputs obtained from respective outputs of Logic Circuitry 202. The output from Auxiliary Register 208 is applied as an input to User Control Exchange Memory (UCEM) 210. Separate items of stored information in Affirmative/Non-Affirmative Register 206 correspond to and are in operative relationship with different particular ones of a plurality of registers, which plurality of registers together comprise UCEM 210. The information stored in any selected one of the plurality of UCEM registers 210 may be displayed on Output Display 212 in a manner determined by the corresponding items of stored information in Affirmative/Non-Affirmative Register 206.

In the illustrative embodiment of the outward appearance of a TEMS station 300 shown in FIG. 3, Manually Activated Switch Means 200 is comprised of a standard push-button key pad 302, a multi-pole/single throw cradle switch (not shown) associated with cradle 304, a multi-pole/two-throw "Index" push-button 306 and a four-position, manually operated Mode Status Switch 308. In the operation of switch 308, the "OFF" switch position represents an off-condition which allows Telephone Station 300 to be programmed or to be used as a standard telephone station by the User. The three remaining switch positions of Switch 308 all represent an on-condition, in which the telephone station operates as a TEMS modified telephone station. The particular mode of operation of the TEMS modified station varies somewhat depending on whether Switch 308 is in its "No" switch position, its "Yes" switch position or its "Rep" (repetition) switch position. Output Display 212 is manifested in FIG. 3 by Output Display 310 and Pointer Display 204 is manifested in FIG. 3 by Pointer Display 312.

Figure 4:
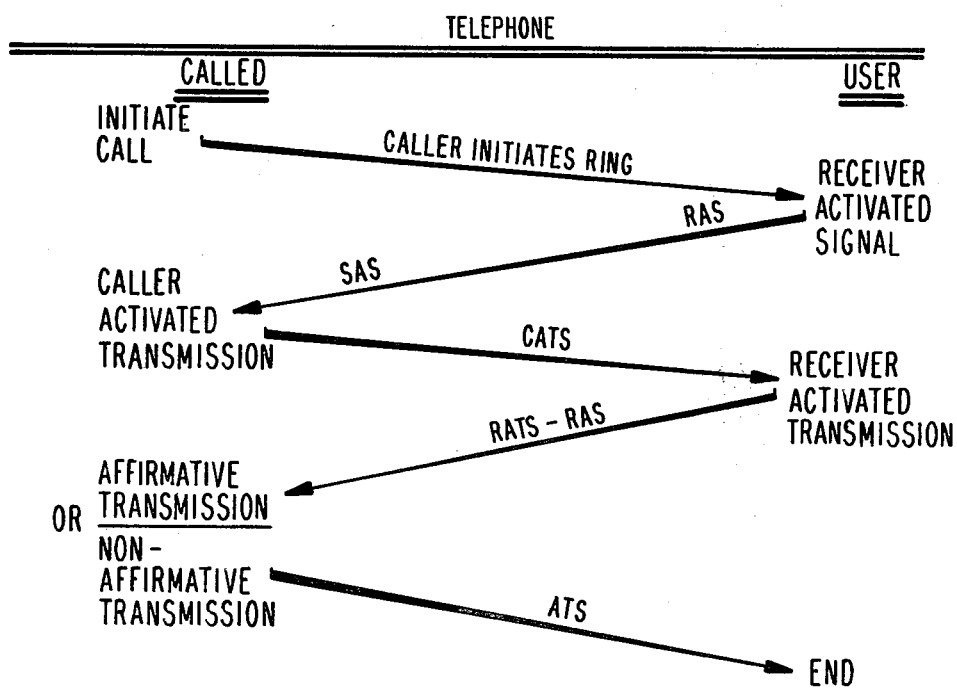
FIG. 4 is a flow chart showing the sequence of events between interconnected Caller and unattended User TEMS Modified stations.

Referring to FIG. 4, assume a Caller having a TEMS modified station wishes to call a User also having a TEMS modified station, but the User is absent at the time. In this case, the User station has its status switch preset to an on-condition. In this on-condition, the User station automatically transmits a Receiver Activated Signal (RAS) back to the Caller in response to the User station being unanswered after a preset number of rings. This receiver activated signal, which is a distinctive tone known to the Caller as indicating that the User station is unattended, invites the Caller to transmit to the User station a Caller-Activated Transmission signal (CATS) of a digital message, such as the telephone number of the Caller or financial information to a Bank. The User station, upon receiving the CATS, stores the digital message and automatically returns to the Caller a Receiver-Activated Transmission signal (RATS) corresponding to the digital message it has just received from the Caller. This RATS from the User station is temporarily stored and displayed on the Output Display 310 of a Caller station, only if the Caller station is a TEMS modified station. The Caller is now in a position to ascertain whether the displayed digital message is, in fact, the intended message believed to have been originally transmitted. If this is the case, the Caller then may send one of three preassigned codes, known by all TEMS subscribers. Two of these preassigned codes are used by the Caller to verify that the digital message is correct. The third preassigned code is used by the Caller to indicate that the digital message is incorrect. In the event the digital message is a telephone number, the Caller can confirm its accuracy in the following way. One of these preassigned codes is indicative of verification of the digital message and also indicative that the User should call back the Caller "collect" (that is, at the Caller's expense). The other of the two preassigned codes also is indicative of a verified digital message, but, in this case, is indicative that the User should call him back at the User's expense. If the displayed message in the Output Register 310 of the Caller's TEMS modified station is incorrect, the Caller may send the third preassigned code, known to all TEMS subscribers, indicative of the fact that this is the case. The receipt of this third preassigned code by the User's TEMS station results, in effect, in the dumping at the User station of the stored digital message from the Caller and permits the Caller to resend the proper digital message. In the latter case, the whole verification process is repeated. The digital message is stored in a prealloted UCEM register either in response to the Caller hanging up, on upon receipt of a disconnect signal. Items of information stored in corresponding portions of Affirmative/Non-Affirmative Register 206 corresponding to a preallotted UCEM register indicate whether the digital message has or has not been verified and, if verified, which one of the two preassigned verification codes was sent. Although described for two preassigned verification codes, this number can be expanded to three or more codes. This flexibility can be of advantage if the digital message is primarily intended for financial or other information transfer.

A TEMS modified station having the outward appearance shown in FIG. 3 may be embodied by the circuitry shown in FIGS. 5 and 6. It should be understood that the circuitry shown in FIGS. 5 and 6 is meant to be only illustrative of one type of structure which may be employed to provide a Telephone Exchange message System having some or all of the features discussed below. It is within the skill of the art to implement the operational features of TEMS by a telephone having a rotary dial, rather than a push-button key pad and/or by other circuitry than that specifically shown in FIGS. 5 and 6.

The following "Operational Description" describes a specific illustrative embodiment of the invention, shown in FIGS. 3, 5 and 6. In this "Operational Description," it is assumed that Pointer Display 312 has a capacity of one hundred numbers, extending from 0 to 99. It is further assumed that the UCEM shown in FIG. 5 comprises a certain plural number N of ten-digit registers, and that the value of this certain plural number N happens to be 98 in the described embodiment. It is also assumed that each of the one hundred pointer-address numbers, other than 0 and 99, designates a particular one of the 98 UCEM registers. The 98 UCEM registers may be divided into first and second sections. The first section of the UCEM registers is used to store digital messages received from other stations (which is the primary purpose of the present invention). The second section of the UCEM registers is used for the secondary purpose of storing frequently-dialed numbers or messages of the User, to thereby permit automatic dialing of these stored digits. The fraction f, selectable by the User, determines the number fN of UCEM registers which are in the first section. Thus, the number of UCEM registers in the second section is (1-f)N. In this "Operational Description", it is assumed that fN has the value of 20 and that (1-f)N has the value 78.

OPERATIONAL DESCRIPTION

1. POINTER ADDRESSING

With the Receiver 314 in the Cradle 304, and the Mode Status Switch 308 in the "off" switch position, the User selects a particular one of the 98 registers of UCEM 500 (which is shown in more detail in FIG. 6 discussed below) by dialing its two-digit address while depressing the Index Button 306. With Index Button 306 depressed, AND gate 5A1 (FIG. 5b) is enabled by a high level applied thereto through Index Button Contacts 5B1 (upper). Tone Generator 502 (which includes key pad 302), in response to each of two successively dialed address digits, transmits a distinctive tone code through enabled AND gate 5A1 and the Off position of Status Switch Contacts 5W3 to Tone Decoder 504. The output from Tone Decoder 504, for each of the two dialed digits, is forwarded through Contacts 5B2 (upper) of depressed Index Button 306, Cradle Switch Contacts 5S4 and OR gate 5R1 to Pointer Advance 506 (FIG. 5a) and to a mode-control and pointer-advance input of 2 BCD (binary-coded-decimal) Counter 508. The output from Tone Decoder 504 (FIG. 5b) may be similar to that from a rotary dial, comprising a D.C. level interrupted by each pulse of a train of pulses equal in number to the value of a dialed address digit. Pointer Advance 506 (FIG. 5a) operates as a pulse "count-up" input circuit to 2 BCD Counter 508. Normally, the two counters of 2 BCD Counter 508 are cascaded to operate as a "unit" counter, responsive to the "count-up" input from Pointer Advance 506, followed by a "tens" counter, which counts up in response to "carry" inputs thereto from the "units counter". However, in response to the presence of a D.C. level at its mode-control and pointer-advance input, 2 BCD Counter 508 operates in a manner similar to a telephone selector circuit, selectively steering the "count-up" input of the first of two dialed digits to its "tens" counter and then the "count-up" input of the second of two dialed digits to its "units" counter. As indicated in FIG. 5a, Pointer Display 312 is operated by 2 BCD Counter 508 to display the count manifested thereby. In general, the pointer address procedure, just discussed, may be utilized to set Pointer Display 312 at any pointer address between "00" and "99". However, for the purpose of UCEM Allocation, the pointer address "99" is utilized.

2. UCEM ALLOCATION

With Pointer Display 312 already set to the Pointer Address "99", Index Button 306 is released, and the User designates the desired value of fN (i.e., 20 in the assumed example) by dialing two digits into Tone Generator 502 (FIG. 5b). Each of these digits passes through AND gate 5A1—which is now enabled by a high input from the 0 output of Pointer Decoder 510 (FIG. 5a) (a number (99) other than 0 now being present) and released Index Button 306 Contacts 5B1 (lower)—to Tone Decoder 504 (FIG. 5b) which operates as described above in paragraph 1. However, now the output from Tone Decoder 504 is forwarded through released Index Button Contacts 5B2 (lower) to AND gate 5A2, which is enabled by a high from the 99 output of Pointer Decoder 510. The output from AND gate 5A2 is forwarded as an input to both UCEM f Input Limit Decoder 512 and Delimiter Decoder 514.

The Delimiter Decoder 514 performs no function at this time because Ring Sensor 516 has not been activated by Ringer 518. However, UCEM f Input Limiter Decoder 512 translates the digit-manifesting signals from Tone Decoder 504 into BCD form and stores them in a register in Digital Comparator 519. The output from Tone Decoder 504 is also applied through released Index Button 306 Contacts 5B2 (lower) as an input to AND gate 5A3 (FIG. 5a). However, the fact that the Pointer Address at this time is 99, causes AND gate 5A3 to be disabled by a low level applied thereto from the "$\overline{0+99}$" output from Pointer Decoder 510. This "$\overline{0+99}$" output is forwarded to AND gate 5A3 through the right input of OR gate 5R5 and is "high" only if the Pointer Address is other than "0" or "99". Further, at this time, flip-flop 5F3 is reset, so that a low level is forwarded to AND gate 5A3 from the set ("1") output of flip-flop 5F3 through the Off contacts of Status Switch 5W1 and the left input to OR gate 5R5. Thus, the only effect, at this time, is the storage of fN (20 in the assumed example) in Digital Comparator 519.

3. RING ALLOCATION

The User next dials a delimiter signal (e.g., "#" on a push-button phone or a "0" on a rotary dial phone) followed by a ring-allocation digit between 1 and 9. The delimiter signal is forwarded, as described in paragraph 2, through AND gate 5A2 (FIG. 5b) and applied as an input to Delimiter Decoder 514. Ring Sensor 516 responds to an output signal from Delimiter Decoder 514 by activating a shift register located inside the ring Sensor. The shift register is loaded by the next dialed digit received thereby (i.e., the ring-allocation digit). Thereafter, whenever Ringer 518 applies a succession of rings exceeding the number stored in the shift register, Ring Sensor 516 produces an output. An output from Ring Sensor 516 is effective in activating an unattended User's station of the TEMS system, which is one of the primary purpose of the present invention.

4. NUMERIC INSTRUCTIONS

A secondary purpose of the present invention is storing frequently-dialed telephone numbers or User messages in the UCEM, so as to permit automatic dialing thereof. In the arrangement shown in FIG. 5 any one of the N (i.e., 1–98 in the assumed example) UCEM registers may be selected by dialing the Pointer Address (as discussed in paragraph 1) of the preceding register (i.e., 0–97 in the assumed example) with Index Button 306 depressed. Specifically, the Pointer Address count stored in 2 BCD Counter 508 (FIG. 5a) is forwarded to UCEM Register Select Input Decoder 520. Decoder 520, in response to a Pointer Address between 0 and 97 selects the corresponding ordinal one of the UCEM registers, as shown in more detail in FIG. 6, described below. A frequently-dialed telephone number or message may then be entered into the next ordinal UCEM register (i.e., between registers 1 and 98), in the manner discussed in paragraph 5 below, by dialing that telephone number or message with Index Button 306 released. In principle, frequently-dialed digits could be stored in any of the 98 UCEM registers. In practice, only those UCEM registers having a Pointer Address greater than the selected value of fN (20 in the assumed example) are used to store the frequently-dialed telephone numbers and/or messages. More specifically, with the Pointer Address initially set to a selected UCEM register between 20 and 97, the dialing of numerical instructions for a frequently-dialed telephone number or message results in AND gate 5A3 being enabled via OR gate 5R5 by a high level from Pointer Decoder 510 due to a high level at the "$\overline{0+99}$" output of Pointer Decoder 510. At this time, AND gate 5A2 is disabled due to a low "99" level from Pointer Decoder 510. The enablement of AND gate 5A3 results in the dialed numeric instruction being forwarded through this AND gate for storage within Auxiliary Register 521.

5. TERMINUS DIGIT "DIALING"

In the specific illustrative embodiment of the invention, the UCEM registers are assumed to be 10 digits in length. Accordingly, the final or terminus digit is the tenth digit.

The contents of Auxiliary Register 521 are automatically transferred to the next ordinal one of the registers of UCEM 500 in response to the completion of the dialing of the TERMINUS (assumed to be 10) digit of the numeric instruction. Specifically, at this time both AND gates 5A4 (FIG. 5b) and 5A5 (FIG. 5a) are enabled due to Status Switch Contacts 5W2 being in its Off position. In addition, AND gate 5A3 is enabled through the OFF position of Status Switch Contact 5W1. Therefore, all the numeric instruction signals applied to the input of AND gate 5A3 appear at its output, and therefore at the inputs of Auxiliary Register 521 and 10 Digit Advance/Transmit 522, which counts the number of dialed digits (rather than the value of the digits) entered into Auxiliary Register 521. After counting 10 dialed digits, 10 Digit Advance/Transmit 522 supplies an input through Cradle Switch Contact 5S2 (FIG. 5b) to enable AND gate 5A4, which is forwarded as an input to delay 5D1 and is also forwarded through OR gate 5R1 to Pointer Advance 506 (FIG. 5a). Pointer Advance 506 operates 2 BCD Counter 508 to increase its count by one. The new BCD count registered in Counter 508 is decoded by UCEM register Select Input Decoder 520, which applies an input to UCEM 500, which is effective in selecting the next ordinal one of the UCEM registers. The length of delay provided by delay 5D1 is sufficient to permit the Pointer Advance 506 to effect the selection of the next ordinal one of UCEM registers prior to the forwarding of delayed output signals from 10 Digit Advance/Transmit 522 through enabled AND gate 5A5 as a transmit signal to UCEM 500. In response to this transmit signal, the contents of Auxiliary Register 521 are transferred to this next selected ordinal one of UCEM registers 500. In addition, the transmit signal forwarded to the output of enabled AND gate 5A5 is also applied to the Set input of flip-flop 5F3. The setting of flip-flop 5F3 removes a low level at its "1" output, and permits a high level which is forwarded at the OFF position of Status Switch Contacts 5W1 to the left input of OR gate 5R5. The left input to OR gate 5R5 operates as a latch to ensure that AND gate 5A3 remains enabled thereafter, so long as flip-flop 5F3 remains in its set state.

6. OFF STATE

The TEMS station 300 operates as a standard telephone circuit when Status Switch 308 is in its OFF position and the Pointer Address that has been dialed into 2 BCD Counter 508 is zero. In this case, the $\overline{0}$ output from Pointer Decoder 510 assumes a low level, thereby disabling AND gate 5A1 (FIG. 5b). Further, the "$\overline{0+99}$" input to OR gate 5R5 from Pointer Decoder 510 assumes a low level. This low level is forwarded to the clear "C" input of flip-flop 5F3 to cause flip-flop 5F3 to be reset. Resetting of flip-flop 5F3 causes a low level to be applied to the left input of OR gate 5R5. Therefore, AND gate 5A3 is disabled. With AND gate 5A1 disabled, the output from Tone Generator 502 cannot control the Pointer Address. With AND gate 5A3 disabled, numerical instructions dialed by the User cannot be forwarded to either Auxiliary Register 521 or any of the registers of UCEM 500.

7. REGISTER DISPLAY

FIG. 6, discussed below, shows the details of how the registers of UCEM 500 (FIG. 5a) and Auxiliary Register 521 are coupled to Display Decoder 523, associated with Output Display 310. At this time, it is only necessary to state, that with Contacts 6B4 in a released condition of Index Button 306, the content of the UCEM register which is then addressed by UCEM Register Select Input Decoder 520 is automatically displayed by 10 Digit Output Display 310. If, however, contacts 6B4 are in a depressed condition of Index Button 306, then the content of Auxiliary Register 521 is displayed.

8. ON STATE

With Status Switch 308 in its "No," "Yes" or "Rep" switch positions and 2 BCD Counter 508 registering any count between 0 and 98 (i.e., other than 99), Telephone Station 300 operates as a TEMS station. In the On state, AND gate 5A3 is enabled through the left input to OR gate 5R5, which is high. Therefore, even if the pointer address happens to be zero, causing a low level from the "$\overline{0+99}$" output from Pointer Decoder 510 to be applied to the right input of OR gate 5R5, AND gate 5A3 is enabled. When a User station is unattended, it is desirable that the User station, besides having the Status Switch 308 set to an On switch position, be initially set at Pointer Address of zero, although the Pointer Address may initially be set at any value between zero and fN-1 (i.e., 19 in the assumed example). The reason that a Pointer Address of zero is desirable is that it permits the maximum number of fN (i.e., 20 in the assumed example) of incoming digital messages to be stored. Therefore, for illustrative purposes, it is first assumed that an unattended User TEMS telephone station has its Status Switch in the "No" position and that the initial Pointer Address is zero. Under these assumed conditions, Digital Comparator 519 (FIG. 5b) applies a high level output to enable AND gate 5A6 through Status Switch Contacts 5W2.

9. INCOMING CALL

An incoming call operates Ringer 518. The output of Ring Sensor 516 goes high, due to the number of rings of Ringer 518 exceeding the number previously input by the User (see paragraph 2 above). The high output of Ring Sensor 516 is forwarded through enabled AND gate 5A6 to the input of Delay 5D2 and also through OR gate 5R1 as an input to Pointer Advance 506 (FIG. 5a). This results in Pointer Advance 506 advancing the count registered in 2 BCD counter 508 by one count (i.e., from 0 to 1 in the assumed example). As long as this new count (i.e., 1 in the assumed example) is no greater than fN (i.e., 20 in the assumed example), AND gate 5A7 will remain enabled by the output from Digital Comparator 519 forwarded thereto through Status Switch Contacts 5W2. In this case, after a delay provided by Delay 5D2 sufficient for 2 BCD Counter 508 to be advanced to its new count, a high level will be forwarded through enabled AND gate 5A7 as an input to Receiver Activated Signal (RAS) means 524, as a set input to flip-flop 5F2, and through OR gate 5R2 as an input to Pointer Backspace 526 (FIG. 5a). Pointer Backspace 526 causes the count registered into 2 BCD Counter 508 to decrease by 1 (return from 1 to 0 in the assumed example). However, the Pointer Advance operation followed by a Pointer Backspace operation, at this time, constitutes a test to ensure that the next advanced count (i.e., 1 in the assumed example) is, in fact, equal to or less than fN (i.e., all of the UCEM registers dedicated to storing incoming calls are not filled).

10. RAS SIGNAL

A high level at the output of AND gate 5A7 (FIG. 5b) sets flip-flop 5F2. In its set state, flip-flop 5F2 energizes Transmission Switch 527 to close its normally open contact 528, thereby connecting the output of Tone Generator 502 to Transmitter 530 of Telephone Station 300. As is conventional, Transmitter 530 is coupled to the telephone network through a telephone line. A high level at AND gate 5A7 also activates RAS 524 to transmit a preassigned code sequence through Delay 5D3 and normally closed contacts 532 of RAS Switch 534 as an input to Tone Generator 502. The delay provided by Delay 5D3 ensures that Transmission Switch Contact 528 are closed at the time the output of RAS 524 reaches Tone Generator 502. Tone Generator 502, in response to the input thereto from RAS 524, generates an RAS signal (FIG. 4) as a preassigned tone sequence corresponding to the preassigned code sequence from RAS 524. This RAS signal from the Tone Generator 502 is then forwarded through closed Transmission Switch Contacts 528 and Transmitter 530 to the telephone network. Status Switch Contacts 5W3 in the "No" switch position prevents the output of Tone Generator 502 from reaching Tone Decoder 504 even if AND gate 5A1 is enabled at this time.

11. SIGNALING BETWEEN USER AND CALLER

The RAS signal passes through the standard switchboard cross-bar contacts of the telephone network, and for purposes of discussion, reaches the Caller's station as a Switchboard Activated Signal (SAS). SAS and RAS are identical codes formed by the same preassigned tone sequence, which, by way of example, may be the code commonly understood in the public domain to mean "send your message". Assuming that the Caller understands that hearing an SAS indicates that he has called an unattended TEMS station, the Caller may dial a desired 10 digit numeric message, such as the Caller's telephone number, just as though the Caller were making a second call. This results in a Caller-Activated Transmission signal to be forward to the User's station via the Switchboard (CATS), of the dialed 10 digit numeric message, being returned through the telephone network back to the unattended User's TEMS station.

12. CATS SIGNAL

The CATS signal (FIG. 4), upon being received by Receiver 536 (FIG. 5b) of the unattended User's TEMS station, is forwarded through the "No" position of Status Switch Contacts 5W3 to Tone Decoder 504. The output of Tone Decoder 504 is forwarded through contacts 5B2 of released Index Button 306 and enabled AND gate 5A3 (FIG. 5a) to the input of Auxiliary Register 521, where the successively received digits of the Caller's message are stored, in like manner to that discussed above in paragraph 4. in response to the receipt of the terminus digit (tenth digit) from the Caller, the Pointer Address then stored in 2 BCD Counter 508 is advanced by one (from 0 to 1 in the assumed example) and, after a delay provided by Delay 5D1, the contents of Auxiliary Register 521 are transferred to that UCEM register having this new pointer address (1 in the assumed example) as described above in paragrah 5. However, in this case, AND gates 5A4 and 5A5 are enabled by the high output of Digital Comparator 519 forwarded through the "No" position of Status Switch Contact 5W2.

13. UCEM ADVANCE

The TEMS operation described in paragraphs 8 through 12 results in each successive incoming call to an unattended User station first making a preliminary advance in the Pointer Address stored in 2 BCD Counter 508 followed by a backspace, in response to ring sensing, and, only in response to the receipt of the terminus (10th) digit of a Caller's instructions, then making a permanent advance in the Pointer Address stored in 2 BCD Counter 508.

14. RATS SIGNAL

A high level at the output of AND gate 5A5 sets flip-flop 5F3, resulting in the high level output of flip-flop 5F3 in its set state being forwarded through the "No" position of Status Switch Contacts 5W1 as a set input to flip-flop 5F4, an enabling input to AND gate 5A8 and a first start signal to UCEM Register Steer-out 538. Steer-out 538 has a signal input associated with the ordinal one of the UCEM registers then selected by UCEM Register Select Input Decoder 520. In response to the application of the first start signal to Steer-out 538, Steer-out 538 serially forwards, in turn, each of the 10 BCD digits in the selected UCEM register, followed by the RAS code sequence, in BCD form, to the input of RATS 540 (FIG. 5b) through enabled AND gate 5A8. RATS unit 540 converts each of the BCD signals into corresponding control signals for operating Tone Generator 502, to thereby transmit back to the Caller (over closed contacts 528, Transmitter 530 and the telephone network) a RATS signal that corresponds to the received CATS signal actually present in the selected UCEM register, followed by a RAS tone sequence (FIG. 4).

15. CALLER'S TEMS STATION

The RATS signal is received at the Caller's station. It then passes through one of the 3 positions "NO", "YES" or "REP" of Status Switch Contacts 5W3, into the Tone Decoder of the Caller's station, through contacts 5B2 of released Index Button 306 and into AND gate 5A3. But the Caller's receiver is out of the cradle. Therefore, his Cradle Switch Contacts S1 and S2 are open. The Caller's open Cradle Switch contacts S2 prevents receipt of the 10th digit of the incoming RATS signal from reaching 10 Digit Advance/Transmit 522 of the Caller's station. The result is that the incoming RATS signal from the User is stored in Auxiliary Register 521 of the Caller's station, but is not transferred into a register of the Caller's UCEM. However, the Caller will hear a preassigned RAS tone sequence of the RATS signal (which occurs after the terminating end of the RATS) a second time. Hearing the RAS a second time indicates to the Caller that the unattended User's TEMS station is requesting confirmation of the accuracy of the CATS transmission previously sent by the Caller.

16. AUXILIARY DISPLAY

Upon hearing the preassigned RAS tone sequence a second time, the Caller, at his TEMS station, can display the contents of his Auxiliary Register 521 on his Output Display 310 by depressing his Index Button 306, thereby closing Index Button Contacts 6B4, shown in FIG. 6, discussed below.

17. DELIMIT SIGNAL

If the Caller notes an error in the displayed number, the Caller dials the delimiter (see paragraph 3 above), followed by a redialing of his numeric message. The delimiter appears at Receiver 536 of the unattended User's telephone, and though forwarded through Tone Decoder 504 to Auxiliary Register 521 through enabled AND gate 5A3, it is not recognized by Auxiliary Register 521 which is designed to block the delimit signal. Further, at this time, AND gate 5A2 is disabled by a Pointer Address other than 99, so that the delimit signal never reaches Delimiter Decoder 514. However, Receiver 536 does forward the delimit signal to the input of Auxiliary Delimit Decoder 542. Since at this time flip-flop 5F4 is in its set state, AND gate 5A9 is enabled. Therefore, Auxiliary Delimit Decoder 542, in response to the receipt of a delimit signal, forwards a high level through enabled AND gate 5A9 and OR gate 5R2 to Pointer Backspace 526. This results in decreasing the Pointer Address in 2 BCD Counter 508 by one. The output of AND gate 5A9 is also applied through OR gate 5R3 and OR gate 5R6 to the reset input of flip-flop 5F3. The resetting of flip-flop 5F3 forwards a low level through the "No" position of Status Switch Contacts 5W1 and disables AND gate 5A8 and removes the high level from the set input of flip-flop 5F4. Shortly after the high is removed from the set input of flip-flop 5F4, flip-flop 5F4 is reset by the output from OR gate 5R3 being applied thereto through Delay 5D4. Therefore, the effect of the delimit signal applied to Auxiliary Delimit Decoder 542 is to return the situation to that which existed prior to the receipt of the original CATS by the User station. The User station then operates on the corrected CATS that follows the delimiter in the manner described above (see paragraphs 13-16). The delimit/message cycle may be repeated again and again until the Caller either confirms that the numeric message is correct, or a disconnect is received by the unattended User station.

18. ATS SIGNAL

If no error is found, the Caller dials an Affirmative Transmission via the switchboard (ATS) code. In the case of where the message is a telephone number, the Caller confirms the transmission accuracy by dialing an ATS code (FIG. 4) in one of two preassigned formats. The first of these formats, Affirmative Transmission at Caller's expense (ATC), indicates that the User should call back as a collect call, and the second of these formats, Affirmative Transmission at User expense (ATU), indicates that the User should call back at his own expense. At the User's unattended TEMS station, the uncoming ATC or the ATU signal appears at Receiver 536 and is forwarded to ATS Decoder 544 (FIG. 5a). At this time, AND gate 5A10 is enabled by set flip-flop 5F4. The output from ATS Decoder 544 is applied through enabled AND gate 5A10 as a first signal input to Affirmative Transmission-Not Affirmative Transmission (ATNAT) 546. ATNAT 546, which has a storage capacity of 196 bits in this example, comprises 98 2-bit registers, each 2-bit register being associated with a different one of the 98 UCEM registers. The register select input to ATNAT 546 from UCEM Register Select Input Decoder 520 steers the signal input from the output of AND gate 5A10 to the ATNAT 2-bit register corresponding to the then-selected UCEM register. More specifically, ATS Decoder 544, in response to the ATC or ATU, produces a binary bit pair for storage in the selected ATNAT 2-bit register. The first bit of the 2-bit pair has a certain binary value, indicating that the Caller has confirmed the transmitted numeric message to the User, and the second of these 2 bits has a variable binary value used to distinguish at whose expense the return call is to be made. The output from ATS Decoder 544 is also used to set flip-flop 5F5. The effect of this is to disable normally enabled AND gate 5A11 whenever an ATS has been sent back by the Caller's station to the unattended User's station.

19. NAT SIGNAL

A disconnect signal is sent from Receiver 536 to Disconnect Sensor 548 (FIG. 5b), in response to the Caller hanging up. The output from Disconnect Sensor 548 is applied to the clear C input of flip-flop 5F2, which immediately resets flip-flop 5F2. The reset of flip-flop 5F2 then de-energizes Transmission Switch 527, thereby opening contact 528 that had been coupling Tone Generator 502 to Transmitter 530. This is equivalent to the unattended User's station hanging up. The output from Disconnect Sensor 548 is also applied through OR gate 5R6 to the reset input of flip-flop 5F3, causing flip-flop 5F3 to reset. In addition, the output from Disconnect Sensor 548 is applied to both the reset input of flip-flop 5F5 and as an input to AND gate 5A11. If prior to hanging up, the Caller has sent an ATS signal, flip-flop 5F5 will be in its set state. In this case, flip-flop 5F5 will reset in response to the Disconnect Sensor 548 output. The effect of resetting flip-flop 5F5 is to permit AND gate 5A11 to be re-enabled by a high on the reset output of flip-flop 5F5, which occurs only after a delay provided by Delay 5D5. This delay is sufficiently long so that at the time that AND 5A11 is re-enabled, a disconnect signal into AND gate 5A11 from the output of Disconnect Sensor 548 is no longer present. Therefore, if an affirmative transmission, has previously occurred, then an output from the Disconnect Sensor 548 will not appear as a No Affirmative Transmission (NAT) at the output of NAT 550. Thus, the effect of a Caller confirming the accuracy of a previously sent message—the Caller sending an ATS signal—is to temporarily disable a disconnect from appearing as an NAT signal by disabling AND gate 5A11. However, in case the Caller has never sent an ATS signal, flip-flop 5F5 remains at all times in its reset state and, therefore, normally enabled AND gate 5A11 remains enabled. In this latter case, the output from Disconnect Sensor 548 is forwarded through enabled AND gate 5A11 as an input to NAT means 550. At this time, flip-flop 5F4 is in its set state, thereby enabling AND gate 5A12. The output from NAT means 550 is forwarded through enabled AND gate 5A12 as a second signal input to ATNAT 546. The output from NAT means 550 is a bit having a binary value opposite to the certain value of the first bit of the binary pair produced by ATS Decoder 544. This bit appears at the output of NAT means 550 and is stored as the first bit in the selected 2-bit register of ATNAT 546. The output from AND gate 5A12 is also applied through OR gate 5R3 and Delay 5D4 as a reset input of flip-flop 5F4. Therefore, after a delay sufficient for the output bit from NAT 550 to be forwarded and stored in ATNAT 546, flip-flop 5F4 is reset, thereby disabling AND gates 5A10 and 5A12.

20. ADDITIONAL CALLS—"NO" MODE

Let us assume that the initial Pointer Address was zero and that that Pointer Address was permanently advanced to 1 in response to the first incoming call in which a terminus (10th) digit of a CATS was received by the unattended User's station. Then, in a similar manner, the Pointer Address will be permanently advanced to the next successive address in response to each additional incoming call in which the 10th digit of a CATS is received at the unattended User's station. Therefore, after fN (20 in the assumed example) of such incoming calls have been received, the Pointer Address registered in 2 BCD Counter 508 is fN (i.e., 20). In this case, when Ring Sensor 516 is activated in response to the next successive incoming call, so that the output of Ring Sensor 516 is applied through enabled AND gate 5A6 as an input to Delay 5D2 and is also applied through enabled AND gate 5A6 as an input to OR gate 5R1 to Pointer Advance 506. This results in the Pointer Address registered in 2 BCD Counter 508 being advanced to fN+1 (21 in the assumed example). A comparison by Digital Comparator 519 of the fN+1 Pointer Address with the output from UCEM f Input Limit Decoder 512 results in a low level being applied through the "No" position of Status Switch Contacts 5W2 to both AND gates 5A6 and 5A7. Therefore, when, thereafter, the delayed output from Delay 5D2 is applied as a signal input to AND gate 5A7, AND gate 5A7 is disabled. Thus, in this case, AND gate 5A7 does not apply a signal to RAS 524, and does not (as is usual) backspace the Pointer Address by a high level forwarded through OR gate 5R2 to Pointer Backspace 526. For this reason, no further operation takes place at the User's station in response to that incoming call. Since AND gate 5A6 is now also disabled, the activation of Ring Sensor 516, in response to further additional incoming calls, is not even forwarded through OR gate 5R2 to Pointer Advance 506. Thus, with the Status Switch in its "No" position, TEMS operation of an unattended User's station shuts down when the pointer address reaches fN+1.

21. ON STATE—"YES/REP" MODES

The operation of an unattended TEMS User's station, with the status switch set to either the "Yes" or the "Rep" position, is, for the most part, the same as that with the status switch in the "No" position, described above. However, the operation with the status switch in either the "Yes" or the "Rep" position, differs from the operation at the status switch in the "No" position in the following respects, described below.

22. STATUS SWITCH (YES)

The status switch in the "Yes" position means that the User desires that additional, if need be, fN+1, fN+2, etc., UCEM registers be employed, even if it means erasing frequently-dialed numbers or other messages stored therein. This is accomplished by the fact that when the Status Switch Contacts 5W2 are in the "Yes" position, the output from Digital Comparator 519 is ineffective in disabling AND gates 5A4, 5A5, 5A6, and 5A7 (as described in paragraph 20).

23. STATUS SWITCH (REP)

When the Status Switch 308 is in the "Rep" position, the fN+1 incoming call results in a recycling process by which the fN+1 incoming call is stored in the first UCEM register, and the earliest incoming call orginally stored in the first UCEM register is erased. This repeition (REP) process occurs when the Staus Switch 308 is in its "Rep" position. Specifically, the activation of Ring Sensor 516 by the fN+1 incoming call results in an output from enabled AND gate 5A6 being forwarded through OR gate 5R1 to Pointer Advance 506, in the manner described in paragraph 20, thereby advancing the count registered in 2 BCD Counter 508 to fN+1. As described in paragraph 20, this results in a low level output from Digital Comparator 519. With Status Switch Contacts 5W2 in the "Rep" position, the low level from Digital Comparator 519 is forwarded as a control input to 2 BCD Counter 508 to effect the resetting of 2 BCD Counter 508 to a Pointer Address of 1. Shortly thereafter, a delayed output from Delay 5D2 is forwarded through enabled AND gate 5A7 and OR gate 5R2 to Pointer Backspace 526, resulting in the pointer address registered in 2 BCD Counter 508 being returned to zero. Should the fN+1 incoming call return a CATS, the Pointer Address will be permanently advanced to 1 in response to the receipt of the 10th digit thereof, in the manner described in paragraphs 5, 12 and 13, and this CATS from the fN+1 incoming call will replace the CATS of the earliest incoming call that was originally stored in the first UCEM register. In a similar manner, the fN+2 call will replace the call orginally stored in the second UCEM register, etc.

24. AUTOMATIC DIALING

The contents of any UCEM register selected in accordance with the Pointer Address stored in 2 BCD Counter 508 can be used to provide automatic dialing. This includes both the frequently-dialed telephone numbers and messages stored by the User, as well as the telephone numbers stored in response to CATS from a Caller to an unattended User station. In either case, the User may select the appropriate Pointer Address in the manner discussed in paragraph 1. In this case, the User removes his handset 314 from Cradle 304. This results in the opening of Cradle Switch Contacts S1, S2 and S4 and the closure of Cradle Switch Contact S3. With handset 314 removed, the User depresses Index Button 306, thereby closing Index Button Contact 5B3, to effect the setting of flip-flop 5F1 (FIG. 5b). The Register Erase Directive (RED) Means 552 is normally maintained inoperative by a high forwarded thereto from reset flip-flop 5F1 through Delay 5D6 and OR gate 5R4. RED 552 is maintained inoperative during and after the switching of flip-flop 5F1 to its set state either by an input to OR gate 5R4 from the delayed reset output of flip-flop 5F1 or the input to OR gate 5R4 from the set output of flip-flop 5F1. The set output of flip-flop 5F1 energizes RAS Switch 534, which operates RAS Switch Contacts 532 so that the output from Autodial 554 is coupled to the input of Tone Generator 502. Further, a set output from flip-flop 5F1 is applied as a second start signal to UCEM Register Steer-out 538. The second start signal operates in a manner similar to the first start signal (see paragraph 14) to steer-out, in turn, each of the 10 BCD digits stored in the selected UCEM register. However, in the case of the second start signal, an RAS code sequence does not follow the steer-out of the 10 stored digits, as was the case with the first start signal. The output from Steer-out 538 is applied directly as an input to Autodial 554. Autodial 554 is similar to RATS Means 540 in converting BCD signals to correspond with push-button signals for controlling Tone Generator 502. However, in this case, Tone Generator 502 never generates a terminating RAS tone sequence, as it does in response to the output from RATS 540.

25. RED SIGNAL

When a User returns to his unattended TEMS station, it is usual for him to return each of the incoming calls having a CATS stored in each of the first fN registers of the User's UCEM. When the User returns, the Pointer Address displayed by Pointer Display 312 is that of the UCEM in which the most recent incoming call is stored. It would be desirable to first automatically dial the number stored in this register, and after the completion of this returned call, automatically erase the dialed number from this register and then automatically backspace the Pointer Address to the preceding register, so that the preceding incoming call then can be returned by automatic dialing. The TEMS station shown in FIG. 5 operates this way when the handset is replaced in the cradle at the end of such a returned call, with Index Button 306 in its released position. In this case, flip-flop 5F1 is reset in response to the closure of Cradle Switch S1. A reset of flip-flop 5F1 immediately removes the high level at the set output of flip-flop 5F1 from the input to OR gate 5R4. Further, a reset output of flip-flop 5F1, in response to the resetting thereof, does not reach the input of OR gate 5R4 until after a delay provided by Delay 5D6. Therefore, there is an interval during which the output from OR gate 5R4, applied to RED means 552, goes low. This results in a Register Erase input from RED means 552 being applied during this interval to the selected digital register of UCEM 500 to erase the number stored therein. Further, after a delay provided by Delay 5D7, the output during this interval from RED means 552 is applied through OR gate 5R2 to Pointer Backspace 526, thereby automatically decreasing the Pointer Address by one to now select the preceding UCEM digital register. Therefore, after all the incoming calls have been returned, the UCEM digital registers for storing the incoming calls will be empty and the Pointer Address will have been automatically set back to its original value (i.e., zero in the assumed example).

26. RED OVERRIDE

When the User wishes to automatically dial a frequently called number normally stored in the digital registers having an ordinal value greater than fN, it is not desirable to erase the stored number upon completion of the call. Also, the User may be unsuccessful at reaching the desired number. In either case, the User depresses Index Button 306 while he is hanging up handset 314 and holds Index Button 306 depressed for a moment thereafter. Flip-flop 5F1 is constructed so that simultaneously applied set and reset inputs thereto results in a high level at both the set and reset outputs of flip-flop 5F1. Thus, with Cradle Switch Contacts S1 closed and with Index Button Contacts 5B3 closed, both the set and reset outputs of flip-flop 5F1 are high. By maintaining Index Button 306 depressed (thereby maintaining Index Button Contacts 5B3 closed) over a period longer than the delay provided by Delay 5D6, the high reset output of flip-flop 5F1 will be forwarded by OR gate 5R4 to RED means 552 through Delay 5D6 before the high level forwarded thereto through OR gate 5R4 from the set output of flip-flop 5F1 goes low in response to the release by the User of Index Button 306. Therefore, in this case, the RED is never rendered operative and the telephone number in the selected UCEM register is not erased.

27. FIG. 6—DETAILS OF UCEM REGISTER INPUTS

UCEM register control inputs to UCEM 500 are shown in both FIGS. 5 and 6. Specifically, UCEM 500 receives control inputs from UCEM Register Select Input Decoder 520, from RED means 552, the output of AND gate 5A5, and the reset input terminal of flip-flop 5F1 and from the set output of flip-flop 5F1. As shown in FIG. 6, UCEM Register Select Input Decoder 520 receives the Pointer Address registered in 2 BCD Counter 508 as an input thereto. Decoder 520 decodes this Pointer Address received in BCD form to produce a high level on only a single one of 98 ordinal outputs therefrom (only 4 of which are shown in FIG. 6). For illustrative purposes, it is assumed that the third output (from the top) from Decoder 520 has a high level and the remaining 97 outputs of Decoder 520 have a low level.

28. FIG. 6—DETAILS OF UCEM

Each of the 10 BCD registers (only 3 of which are shown) of each of the 98 UCEM registers (only 4 of which are shown) has an individual input AND gate and an individual output AND gate associated therewith. Specifically, input AND gates respectively designated "W, U, S, and P" are respectively associated with registers 1, 2, 3 and 4, in the manner shown in FIG. 6. The output AND gates associated with each ordinal one of the registers are enabled directly in response to a high level on the corresponding ordinal one of the outputs of Decoder 520. These output AND gates are respectively designated "X, V, T and Q" and associated with registers 1, 2, 3 and 4. However, the input AND gates associated with each of the ordinal registers are only enabled in response to a high level on the corresponding ordinal one of the outputs of Decoder 520 during the time that input control AND gates (e.g., 6L, 6N, 6M and 6L) are enabled. An output from 10 Digital Advance/Transmit 522 can occur regardless of whether handset 314 is off-hook (Cradle Switch 304 operated) or on-hook (Cradle Switch 304 unoperated). However, as long as handset 314 is on-hook, flip-flop 5F1 remains reset and, therefore, Control AND gate 6AC is disabled by the low level applied thereto from the set output of flip-flop 5F1. On the other hand, an output from AND gate 5A5 can only occur in response to an output from 10 Digital Advance/Transmit 522 if handset 314 is on-hook (due to the presence of Cradle Switch Contacts S2 shown in FIG. 5). A signal received from the output of AND gate 5A5 is forwarded through control OR gate 6RC to enabled AND gates 6H1–6H10 individually associated with the 10 stages of Auxiliary Register 521 (only 3 of which are shown) and is simultaneously applied as an enabling input to AND gate 6L, 6M, 6N and 6O. The contents of each of these stages of Auxiliary Register 521 is forwarded to the corresponding stage of the selected UCEM register through respective AND gates 6H1–6H10 and through a respective input AND gate for the selected register, all of which AND gates are simultaneously enabled during the presence of a high level from the output of AND gate 5A5, and the solitary high level output from UCEM Register Select Input Decoder 520 at the selected UCEM register.

30. FIG. 6—UCEM REGISTER OUTPUT TO DISPLAY

As long as Index Button 306 is released and a selected register is loaded with a stored number, the stored number, in BCD form, is forwarded to Display Decoder 523 for display on Output Display 310 and is also forwarded as an input to UCEM Register Steer-out 538. More specifically, each of 10 OR gates (e.g., OR gate 6R1) is individually associated with a different one of the 10 stages of all 98 digital registers and through the output AND gates. Since only the output AND gates associated with the selected register are enabled, the BCD bits of each stage (e.g., stage 1) of the selected register (e.g., register 3) are output through its associated AND gate (e.g., 6T1) and forwarded through its associated OR gate (e.g., 6R1) and applied as one of 10 BCD bits input to UCEM Register Steerout 538. Associated with the output of each of the 10 OR gates is a corresponding AND gate (e.g., 6Y1) which remains enabled so long as Index Button 306 is in its released position. The respective outputs from the 10 AND gates, such as AND gates 6Y1, are forwarded through corresponding OR gates, such as OR gate 6G1, that apply respective inputs to Display Decoder 523. This Display Decoder 523 decodes the 10 BCD signals applied thereto and energizes each of the 10 digits of the 10 Digital Output Display 310 in accordance therewith.

31. FIG. 6—AUXILIARY REGISTER DISPLAY

In order to display the contents of Auxiliary Register 521 (such as the display of the RATS at the Caller's station), it is necessary that handset 314 be off-hook and that Index Button 306 be depressed. With handset 314 off-hook, Cradle Switch Contacts S1 and S2, shown in FIG. 5, are open. Therefore, no reset input is applied to flip-flop 5F1. Depressing Index Button 306 applies a high level through closed Index Button Contact 5B3 to the set input of flip-flop 5F2. Therefore, no reset input is applied to flip-flop 6F1. Further, the output from AND gate 5A5 will never go high in response to a receipt of the terminus (10th) digit by 10 Digit Advance/Transmit 522. However, the output from 10 Digit Advance/Transmit 522, will, in this cae, set flip-flop 6F1, thereby enabling control AND gate 6AC. Since the Index Button 306 is depressed, flip-flop 5F1 is set and a high level at the set output of flip-flop 5F1 is present at the input, and therefore the output of enabled control AND gate 6AC. The high level is forwarded through control OR gate 6RC to enable Aux. Register output AND gates 6H1–6H10. At the same time, the depressed Index Button Contact 6B4 disables AND gate 6Y1–6Y10 and enables AND gates 6Z1–6Z10. The respective outputs of the 10 stages of Auxiliary Register 521 are forwarded through corresponding enabled AND gates 6H1–6H10 and enabled AND gates 6Z1–6Z10 and the corresponding OR gates of 6G1–6G10 as the 10 digit BCD input to Display Decoder 523. After decoding by Display Decoder 523, the 10 digit number stored in Auxiliary Register 521 is displayed to the Caller by output Display 310, and this display lasts so long as Index Button 306 remains depressed with handset 314 off-hook. When handset 314 is replaced on-hook, flip-flops 5F1 and 6F1 are reset by the high level applied through Cradle Switch Contacts S1 shown in FIG. 5, thereby disabling control AND gate 6AC.

32. DISPLAY BLINK CONTROL

Display Blink Control 556 (FIG. 5a) controls the lighting of both Pointer Display 312 and Output Display 310 in accordance with ATNAT information applied thereto from ATNAT 546 and with override information applied thereto from Digital Comparator 519 (the latter being effective if, and only if, AND gate 5A13 is enabled by Status Switch Contacts 5W4 being in either the "Yes" or "Rep" positions). More specifically, Display Blink Control 556 produces respective pointer and output display controls causing signal manifestations to appear to the User. For example, each of these displays may be steadily lit, or the lighting may blink slowly, or the lighting may blink quickly, in accordance with the state of the input signals that have been received. For instance, Pointer Display 312 normally may be continuously lit. However, if an override input is received, indicative of the fact that Caller digital messages have been lost because the status switch is in either the "Yes" or "Rep" position and more than fN incoming calls have been received by an unattended TEMS User phone, display blink control may apply a control signal to Pointer Display 312 to effect blinking. This blinking informs the User, on his return, of the fact that the total number of incoming calls exceeded fN and that he has lost some information that was previously stored in the UCEM registers. The ATNAT input is a 2-bit code which indicates whether a digital message stored in any UCEM register has been verified or non-verified and, if verified, whether the User should call back at the Caller's expense or at the User's expense. The display blink control permits non-verified calls to be displayed by Output Display 310 with continuous lighting, verified calls at the User's expense with slow blinking and verified calls at the Caller's expense with quick blinking, by way of example.

It should be understood that the particular numbers used are for illustrative purposes only, and should not be construed as limiting. For instance, longer digital messages may be stored by employing UCEM digital registers with a capacity larger than ten. Further, the significance to the User of a digital message from a Caller need not be limited to a telephone number. For instance, the digital message may include a portion in which numbers correspond with the designation of standard messages—such as, "Arrived safely," "Emergency," etc.—these message can be included in a directory of numerically listed standard messages. Furthermore, TEMS is flexible, and lends itself to minor modification to additionally meet specialized needs. For example, a simple circuit can be added so that a special code, known only to certain Callers, is interpreted as a ring signal. In this case, Callers with access to this code may leave several messages in several successive UCEM registers prior to disconnecting.

What is claimed is:

1. A telephone station adapted to be connected to a telephone network, said station comprising:

manually-activated switch means including a dial;
a cradle switch;
digital storage means including a plurality of registers;
means for selectively allotting an individual one of said registers;
a pointer display coupled to said selectively-allotting means for indicating said allotted one of said digital registers;
an output display coupled to said digital storage means for indicating the digital value stored in said allotted one of said digital registers; and
logic means coupled to said manually-activated switch means, said cradle switch, said digital storage means, and said selectively-allotting means for:
(1) operating said selectively-allotting means under the control of said manually-activated switch means to selectively-allot any single one of said digital registers;
(2) placing said telephone station in an unattended status mode in accordance with an operation of said manually-activated switch means so that said station can answer incoming calls received from said telephone network with said cradle switch on-hook;
(3) operating said selectively-allotting means when said station is in said unattended status mode in response to an incoming call to said station in which a digital message from a caller is received to selectively-allot a digital register to that call; and
(4) forwarding each of said received digital messsages when said station is in an unattended status mode to the digital register allotted to that call for storage therein; wherein:
said digital storage means includes an auxiliary register;
said logic means includes means responsive to the receipt of any digital message received from a caller through said telephone network for forwarding said digital message to said auxiliary register for storage therein, and means enabled thereafter only in response to said cradle switch being on-hook for transferring the content of said auxiliary register to the digital register allotted to that call for storage therein;
said manually-activated switch means includes a switch for coupling said output display to said allotted one of said digital registers in a normal switch position thereof and coupling said output display to said auxiliary register in an operated switch position thereof;
said logic means includes means responsive to the receipt of an incoming call when said station is in an unattended status mode for transmitting to said caller through said telephone network a distinctive tone indicative of the fact that said station is unattended, whereby said caller is informed that he may send a digital message through said telephone network to said unattended telephone station;
said logic means includes steer-out means responsive to the transfer of the contents of said auxiliary register to said allotted one of said digital registers for transmitting the digital message stored in said allotted one of said digital registers followed by said distinctive tone back to the caller through said telephone network for verification by the caller;
said digital storage means includes verification storage means individually associated with each of said digital registers for storing a bit indicative of whether or not the digital message stored in an individual digital register has been verified;
said logic means includes means responsive to an affirmative code received through said telephone network from the caller for storing a bit having a certain binary value indicative of verification of said digital message in the verification storage means individually associated with the allotted one of said digital registers; and
said output display includes means coupled to said verification means, and responsive to said stored bit associated with that one of said digital registers in which the digital message then being displayed is stored having said certain binary value for displaying that digital message with a particular attribute which distinguishes the output display thereof from that of a non-verified digital message.

2. The telephone station defined in claim 1 wherein:
said means responsive to an affirmative code (1) is responsive to a first affirmative code, indicative of both verification and that the caller requests that he be called back collect, for deriving a first bit having said certain binary value and a second bit having a given binary value, (2) and is responsive to a second affirmative code, indicative of both verification and that the caller requests that he be called back at the expense of the user of said unattended station, for deriving said first bit having said certain binary value and said second bit having a binary value opposite to said given binary value, both said first and second bits being stored in said verification storage means individually associated with the allotted one of said digital registers; and
said means for displaying the messsage with a particular attribute derives a first particular attribute in response to said second bit having said given binary value and a different second particular attribute in response to said second bit having said opposite binary value.

3. The telephone station defined in claim 1, wherein said logic means includes means responsive to receiving, through said telephone network, a disconnect by the caller, without a prior receipt of an affirmative code, for storing a bit, having a binary value opposite to said certain value indicative of non-verification of said digital message from said caller in the verification storage means individually associated with the allotted one of said digital registers.

4. A telephone station adapted to be connected to a telephone network, said station comprising:
manually-activated switch means including a dial;
a cradle switch;
digital storage means including a plurality of registers;
means for selectively allotting an individual one of said registers;
a pointer display coupled to said selectively-allotting means for indicating said allotted one of said digital registers;
an output display coupled to said digital storage means for indicating the digital value stored in said allotted one of said digital registers; and
logic means coupled to said manually-activated switch means, said cradle switch, said digital storage means, and said selectively-allotting means for:
(1) operating said selectively-allotting means under the control of said manually-activated switch means to selectively-allot any single one of said digital registers;

(2) placing said telephone station in an unattended status mode in accordance with an operation of said manually-activated switch means so that said station can answer incoming calls received from said telephone network with said cradle switch on-hook;

(3) operating said selectively-allotting means when said station is in said unattended status mode in response to an incoming call to said station in which a digital message from a caller is received to selectively-allot a digital register to that call; and (4) forwarding each of said received digital messages when said station is in an unattended status mode to the digital register allotted to that call for storage therein, wherein value and a different second particular attribute in response to said second bit having said opposite binary value; wherein:

said plurality of digital registers comprise N digital registers ordinally arranged in a series extending from 1 to N.

said selectively-allotting means includes a counter coupled to said pointer display and said digital storage means for selectively-allotting each digital register in said series in accordance with the count registered in said counter and displaying the count registered in said counter on said pointer display;

said logic means includes means operated under the control of said manually-activated switch means for registering a selected count in said counter;

said N digital registers are divided into a first section comprising f N digital registers and a second section comprising (1-f)N digital registers, where f is a fraction, and wherein one of said first and second sections is dedicated to storing digital messages received by said telephone station when in an unattended status mode and the other of said sections is employed for storing frequently-dialed telephone numbers; and said logic means includes means under the control of said manually-activated switch means for selectively entering a frequently dialed number in a respective one of said digital registers of said other of said sections.

5. The telephone station defined in claim 4 wherein:
the count capacity of said counter is more than N; and
said logic means includes means operated under the control of said manually-activated switch means and responsive to said counter having a particular count other than 1 to N registered therein for selectively choosing the value of f and hence the respective values of f N and (1-f)N of digital registers in said first and second sections, respectively.

6. The telephone station defined in claim 5 wherein:
the count capacity of said counter extends from zero to N+1 and N+1 is said particular count;
said logic means includes means responsive to the receiving of an incoming call when said station is in an unattended status mode for advancing the count in said counter by one, comparing the advanced count registered in said counter to fN, and only if said advanced count is no greater than fN back spacing the count in said counter by one and transmitting through said telephone network to said caller a distinctive tone indicative of the fact that said telephone station is unattended, whereby said caller may transmit a digital message through said telephone network to said unattended station; and
said logic means includes means responsive to the receiving of a digital message through said telephone network from said caller for again advancing the count registered in said counter by one and then storing that digital message in the ordinal one of said digital registers allotted by said advanced count.

7. A telephone station adapted to be connected to a telephone network, said station comprising:

manually-activated switch means including a dial;

a cradle switch;

digital storage means including a plurality of registers;

means for selectively allotting an individual one of said registers;

a pointer display coupled to said selectively-allotting means for indicating said allotted one of said digital registers;

an output display coupled to said digital storage means for indicating the digital value stored in said allotted one of said digital registers; and logic means coupled to said manually-activated switch means, said cradle switch, said digital storage means, and said selectively-allotted means for:

(1) operating said selectively-allotting means under the control of said manually-activated switch means to selectively-allot any single one of said digital registers;

(2) placing said telephone station in an unattended status mode in accordance with an operation of said manually-activated switch means so that said station can answer incoming calls received from said telephone network with said cradle switch on-hook;

(3) operating said selectively-allotting means when said station is in said unattended status mode in response to an incoming call to said station in which a digital message from a caller is received to selectively-allot a digital register to that call; and (4) forwarding each of said received digital messages when said station is in an unattended status mode to the digital register allotted to that call for storage therein, wherein value and a different second particular attribute in response to said second bit having said opposite binary value; wherein:

said plurality of digital registers comprise N digital registers ordinally arranged in a series extending from 1 to N;

said selectively-allotting means includes a counter coupled to said pointer display and said digital storage means for selectively-allotting each digital register in said series in accordance with the count registered in said counter and displaying the count registered in said counter on said pointer display;

said logic means includes means operated under the control of said manually-activated switch means for registering a selected count in said counter; and said logic means for placing said telephone station in an attended status mode in accordance with an operation of said manually-activated switch means, and means responsive to said cradle switch being off-hook with said counter registering a selected count between 1 and N for automatically dialing a telephone number included within the digital message stored within the ordinal one of such digital registers 1 to N corresponding to the count registered in said counter.

8. The telephone station defined in claim 7, wherein said logic means includes read erase means responsive to said telephone station, when in an attended status mode with said counter registering a selected count between 1 and N, going from an off-hook to an on-hook condition, for erasing the digital message stored in the ordinal one of said digital registers corresponding to the count registered in said counter and thereafter back spacing the count registered in said counter by one.

9. The telephone station defined in claim 7 wherein:
said N digital registers are divided into a first section comprising f N digital registers and a second section comprising (1-f)N digital registers, where f is a fraction, and wherein one of said first and second sections is dedicated to storing digital messages received by said telephone station when in an unattended status mode and the other of said sections is employed for storing frequently-dialed telephone numbers;
said logic means includes means under the control of said manually-activated switch means for selectively entering a frequently dialed number in a respective one of said digital registers of said other of said sections; and
said logic means includes means under the control of said manually activated switch means for preventing the operation of said read erase means for said frequently dialed telephone numbers.

10. The telephone station defined in claim 7, wherein said counter has a count capacity greater than N, and wherein when a certain count other than 1 to N is registered in said counter and said station is in an attended status mode, said station operates as a standard station.

11. The telephone station defined in claim 10, wherein said counter has a count capacity which includes zero to N, and wherein zero is said certain count.

* * * * *